US012226924B2

(12) United States Patent
Wayment et al.

(10) Patent No.: US 12,226,924 B2
(45) Date of Patent: Feb. 18, 2025

(54) ROTARY CUTTER

(71) Applicant: Gracewood Management, Inc., West Valley City, UT (US)

(72) Inventors: Cody Wayment, West Valley City, UT (US); Craig Fraser, West Valley City, UT (US)

(73) Assignee: GRACEWOOD MANAGEMENT, INC., West Jordan, UT (US)

( * ) Notice: Subject to any disclaimer, the term of this patent is extended or adjusted under 35 U.S.C. 154(b) by 373 days.

(21) Appl. No.: 17/816,793

(22) Filed: Aug. 2, 2022

(65) Prior Publication Data

US 2023/0044800 A1 Feb. 9, 2023

Related U.S. Application Data

(60) Provisional application No. 63/228,739, filed on Aug. 3, 2021.

(51) Int. Cl.
*B26B 25/00* (2006.01)
*B26B 29/00* (2006.01)

(52) U.S. Cl.
CPC ............ *B26B 25/005* (2013.01); *B26B 29/00* (2013.01)

(58) Field of Classification Search
CPC ........ B26B 25/005; B26B 29/00; B26B 29/02
USPC ........ 30/29.5, 307, 392, 286, 292, 289, 293, 30/319, 391
See application file for complete search history.

(56) References Cited

U.S. PATENT DOCUMENTS

| | | | |
|---|---|---|---|
| 3,766,647 | A | 10/1973 | Steiner |
| 3,802,080 | A | 4/1974 | Peter |
| 4,062,116 | A | 12/1977 | Arnott |
| 4,301,594 | A | 11/1981 | Okada |
| 5,101,564 | A | 4/1992 | Melter |
| 5,299,355 | A | 4/1994 | Boda et al. |
| 5,355,588 | A | 10/1994 | Brandenburg, Jr. et al. |
| 5,493,781 | A | 2/1996 | Saito |
| 5,711,077 | A | 1/1998 | Schulz et al. |
| 5,765,289 | A | 6/1998 | Schulz et al. |
| 6,044,565 | A | 4/2000 | Arend et al. |
| 6,282,794 | B1 | 9/2001 | Cho et al. |
| 6,327,783 | B1 | 12/2001 | Ming |
| 6,460,254 | B1 | 10/2002 | Mori et al. |
| 6,643,936 | B2 | 11/2003 | Carlson et al. |

(Continued)

FOREIGN PATENT DOCUMENTS

WO 2023015177 A1 2/2023

OTHER PUBLICATIONS

International Preliminary Report on Patentability for International Application No. PCT/US2022/074417, dated Feb. 6, 2024, 5 pages.

(Continued)

*Primary Examiner* — Ghassem Alie

(74) *Attorney, Agent, or Firm* — Barnes & Thornburg LLP; Ryan L. Marshall; Jessica Kiser

(57) ABSTRACT

A hand-held, rotary fabric cutter includes a handle having a blade end and a grip end opposite the blade end configured to be held by a user to support the cutter during use of the cutter to cut a piece of fabric, a rotary blade, and a blade retention system. The rotary blade is configured to be coupled to the blade end of the handle to rotate about an axis. The blade retention system is configured to selectively couple the rotary blade to the handle.

16 Claims, 9 Drawing Sheets

(56) References Cited

U.S. PATENT DOCUMENTS

| | | | |
|---|---|---|---|
| 7,073,263 | B2 | 7/2006 | Kawasaki |
| 7,111,402 | B1 | 9/2006 | Pearman |
| 7,204,023 | B2 | 4/2007 | Chang |
| 7,415,915 | B2 | 8/2008 | Parrish et al. |
| 7,434,319 | B2 | 10/2008 | Tsai-Lian |
| 7,444,749 | B1 | 11/2008 | Chen |
| 8,046,922 | B2 | 11/2011 | Eby et al. |
| 8,590,163 | B1 | 11/2013 | Bagley et al. |
| 9,119,422 | B2 | 9/2015 | Lance et al. |
| 9,278,459 | B2 | 3/2016 | Block |
| 9,592,622 | B2 | 3/2017 | Bagley |
| 10,391,655 | B2 | 8/2019 | Votolato et al. |
| 10,710,265 | B2 | 7/2020 | Snow et al. |
| 11,833,701 | B2 * | 12/2023 | Huesman .............. B26B 25/005 |
| 2002/0138989 | A1 | 10/2002 | Kozyrski et al. |
| 2005/0028388 | A1 | 2/2005 | Liu |
| 2005/0086811 | A1 | 4/2005 | Kawasaki |
| 2007/0028461 | A1 * | 2/2007 | Chen Lin .............. B26B 25/005 30/319 |
| 2008/0010839 | A1 | 1/2008 | Eby et al. |
| 2008/0201960 | A1 | 8/2008 | Watanabe |
| 2009/0183378 | A1 | 7/2009 | Eby et al. |
| 2011/0078908 | A1 | 4/2011 | Bagley |
| 2011/0192034 | A1 | 8/2011 | Holcomb et al. |

OTHER PUBLICATIONS

PCT; App No. PCT/US2022/074417; International Search Report and Written Opinion mailed Dec. 20, 2022.

* cited by examiner

ROTARY CUTTER

RELATED APPLICATION

This application claims priority to U.S. provisional application No. 63/228,739, filed Aug. 3, 2021. The disclosure of this priority application is incorporated herein in its entirety.

FIELD OF DISCLOSURE

The present disclosure relates generally to devices for cutting fabric, and more specifically to hand-held, rotary blade devices for cutting fabric.

BACKGROUND

Rotary blade and hand-held fabric cutters, hereinafter referred to as "rotary cutters," may be used in industrial, commercial, or home settings for the cutting fabric. Rotary cutters are usually used for cutting one or two layers of fabric at a time. Rotary cutters provide for improved precision and speed compared to scissors and the like.

Overtime, the blade of the rotary cutter may dull and, therefore, need to be replaced with a newer, sharper blade. The new, sharp blade needs to be handled carefully. The rotary cutter may include safety features to protect the user from accidently contacting the blade edge. It remains difficult however, to replace the rotary blade without directly handling the old and new blades which puts the user at risk to injury.

SUMMARY

The present disclosure may comprise one or more of the following features and combinations thereof.

A hand-held, rotary fabric cutter may comprise a handle, a rotary blade, and a blade retention system. The handle may have a blade end and a grip end opposite the blade end configured to be held by a user to support the cutter during use of the cutter to cut a piece of fabric. The rotary blade may be configured to be coupled to the blade end of the handle to rotate about an axis. The blade retention system may be configured to selectively couple the rotary blade to the handle.

In some embodiments, the blade retention system may comprise a blade fastener, a quick release mechanism, and at least one magnet coupled to the blade end of the handle. The blade fastener may be configured to change between a secured position in which the blade fastener extends axially through the rotary blade into the blade end of the handle to secure the rotary blade to the handle and a released position in which the blade fastener has moved away from the handle to allow access to the blade. The quick release mechanism may be configured to change between a locked configuration in which movement of the blade fastener relative to the handle is blocked when the blade fastener is in the secured position and an unlocked configuration in which movement of the blade fastener away from the handle is permitted. The magnet may be configured to apply a magnetic force to the rotary blade to draw the rotary blade to the blade end of the handle so that the rotary blade remains coupled to the blade end of the handle when the blade fastener is in the released position.

In some embodiments, the handle may comprise a handle body and a retractable blade guard. The blade guard may be coupled to the handle body to define a portion of the blade end of the handle. The blade guard may be slidable relative to the handle body between a guard position and a retracted position. In the guard position, the blade guard may block access to a blade edge of the rotary blade. In the retracted position, the blade guard may have moved away from the blade edge of the rotary blade so that the blade edge is exposed to cut the piece of fabric.

In some embodiments, the magnet may be located between the handle body and the retractable blade guard. The magnet may be configured to move with the blade guard between the guard position and the retracted position.

In some embodiments, the blade fastener may include a fastener head and a post. The post may extend axially from the fastener head into the blade end of the handle when the blade fastener is in the secured position.

In some embodiments, the blade retention system may include at least two magnets. In some embodiments, the blade retention system may include three magnets.

In some embodiments, each magnet may be located between the handle body and the retractable blade guard. Each of the magnets may be configured to move with the blade guard between the guard position and the retracted position.

In some embodiments, the quick release mechanism may comprise a post retainer coupled to the handle and a release lever coupled to the handle. The post retainer may be configured to receive a portion of the blade fastener when the blade fastener is in the secured position. The post retainer may be configured to change between a closed position when the quick release mechanism is in the locked configuration and an open position when the quick release mechanism is in the unlocked configuration. The release lever may be slidable relative to the handle body between a first position when the quick release mechanism is in the locked configuration and a second position when the quick release mechanism is in the unlocked configuration in which the release lever engages the post retainer to cause the post retainer to change from the closed position to the open position.

In some embodiments, the handle may comprise a handle body and a retractable blade guard. The retractable blade guard may be coupled to the handle body to define a portion of the blade end of the handle. The retractable blade guard may be slidable relative to the handle body between a guard position in which the blade guard blocks access to a blade edge of the rotary blade and a retracted position in which the blade guard has moved away from the blade edge of the rotary blade so that the blade edge is exposed to cut the piece of fabric.

In some embodiments, the magnet may be located between the handle body and the retractable blade guard. The magnet may be configured to move with the blade guard between the guard position and the retracted position.

According to another aspect of the present disclosure, a hand-held, rotary fabric cutter may comprise a handle, a rotary blade, and a blade retention system. The handle may have a blade end and a grip end opposite the blade end configured to be held by a user to support the cutter during use of the cutter to cut a piece of fabric. The rotary blade may be configured to be coupled to the blade end of the handle to rotate about an axis. The blade retention system may be configured to selectively couple the rotary blade to the handle.

In some embodiments, the blade retention system may comprise a blade fastener and at least one magnet coupled to the blade end of the handle. The blade fastener may be configured to change between a secured position in which the blade fastener extends axially through the rotary blade into the blade end of the handle to secure the rotary blade to the handle and a released position in which the blade fastener has moved away from the handle to allow access to the blade. The magnet may be configured to apply a magnetic force to the rotary blade to draw the rotary blade to the blade end of the handle so that the rotary blade remains coupled to the blade end of the handle when the blade fastener is in the released position.

In some embodiments, the handle may comprise a handle body and a retractable blade guard. The retractable blade guard may be coupled to the handle body to define a portion of the blade end of the handle. The retractable blade guard may be slidable relative to the handle body between a guard position in which the blade guard blocks access to a blade edge of the rotary blade and a retracted position in which the blade guard has moved away from the blade edge of the rotary blade so that the blade edge is exposed to cut the piece of fabric.

In some embodiments, the magnet may be located between the handle body and the retractable blade guard. The magnet may be configured to move with the blade guard between the guard position and the retracted position.

In some embodiments, the blade fastener may include a fastener head and a post. The post may extend axially from the fastener head into the blade end of the handle when the blade fastener is in the secured position.

In some embodiments, the rotary fabric cutter may further comprise a quick release mechanism. The quick release mechanism may be configured to change between a locked configuration and an unlocked configuration. In the locked configuration, movement of the blade fastener relative to the handle may be blocked when the blade fastener is in the secured position. In the unlocked configuration, movement of the blade fastener away from the handle may be permitted.

In some embodiments, the quick release mechanism may comprise a post retainer and a release lever. The post retainer may be coupled to the handle. The post retainer may be configured to receive a portion of the blade fastener when the blade fastener is in the secured position. The post retainer may be configured to change between a closed position when the quick release mechanism is in the locked configuration and an open position when the quick release mechanism is in the unlocked configuration. The release lever may be coupled to the handle and slidable relative to the handle body between a first position when the quick release mechanism is in the locked configuration and a second position when the quick release mechanism is in the unlocked configuration in which the release lever engages the post retainer to cause the post retainer to change from the closed position to the open position.

In some embodiments, the blade retention system may include at least two magnets. In some embodiments, the blade retention system may include three magnets.

According to another aspect of the present disclosure, a method may comprise providing a handle, an old rotary blade, a new rotary blade, and a blade retention system. The handle may have a blade end and a grip end opposite the blade end. The blade end may be configured to be held by a user to support the cutter during use of the cutter to cut a piece of fabric.

In some embodiments, the blade retention system may comprise a blade fastener, a quick release mechanism, and a magnet coupled to the blade end of the handle. The blade fastener may extend axially through the old rotary blade into the blade end of the handle to secure the old rotary blade to the handle. The quick release mechanism may be configured to change between a locked configuration in which movement of the blade fastener relative to the handle is blocked and an unlocked configuration in which movement of the blade fastener away from the handle is permitted. The magnet may be configured to apply a magnetic force to the old rotary blade to draw the old rotary blade to the blade end of the handle so that the old rotary blade remains coupled to the blade end of the handle when the blade fastener is in the released position.

In some embodiments, the method may further comprise changing the quick release mechanism from the locked configuration to the unlocked configuration. Changing the quick release mechanism from the locked configuration to the unlocked configuration may cause the blade fastener to move away from the handle to allow access to the old rotary blade.

In some embodiments, the method may further comprise applying a removal force to the old rotary blade. The removal force may be applied to the old rotary blade to overcome the magnetic force of the magnet so as to separate the old rotary blade from the handle.

In some embodiments, the method may further comprise moving the magnet over a new rotary blade. The magnet may be moved over the new rotary blade so that the magnetic force draws the new rotary blade to the blade end of the handle to couple the new rotary blade to the blade end of the handle, and In some embodiments, the method may further comprise inserting the blade fastener into the blade end of the handle. The blade fastener may be inserted into the blade end of the handle so that the blade fastener extends axially through the new rotary blade to secure the new rotary blade to the handle.

In some embodiments, the handle may comprise a handle body and a retractable blade guard coupled to the handle body to define a portion of the blade end of the handle. The retractable blade guard may be slidable relative to the handle body between a guard position in which the blade guard blocks access to a blade edge of the rotary blade and a retracted position in which the blade guard has moved away from the blade edge of the rotary blade so that the blade edge is exposed to cut the piece of fabric.

In some embodiments, the method may further include moving the retractable blade guard to the retracted position. Moving the retractable blade guard to the retracted position may cause the magnet to move away from the new rotary blade so that the new rotary blade is free to rotate about the axis.

According to another aspect of the present disclosure, a method may comprise providing a handle, an old rotary blade, a new rotary blade, and a blade retention system. The handle may have a blade end and a grip end opposite the blade end. The blade end may be configured to be held by a user to support the cutter during use of the cutter to cut a piece of fabric.

In some embodiments, the blade retention system may comprise a blade fastener and a magnet coupled to the blade end of the handle. The blade fastener may extend axially through the old rotary blade into the blade end of the handle to secure the old rotary blade to the handle. The magnet may be configured to apply a magnetic force to the old rotary blade to draw the old rotary blade to the blade end of the handle so that the old rotary blade remains coupled to the blade end of the handle when the blade fastener is in the released position.

In some embodiments, the method may further comprise applying a removal force to the old rotary blade. The removal force may be applied to the old rotary blade to overcome the magnetic force of the magnet so as to separate the old rotary blade from the handle.

In some embodiments, the method may further comprise moving the magnet over a new rotary blade. The magnet may be moved over the new rotary blade so that the magnetic force draws the new rotary blade to the blade end of the handle to couple the new rotary blade to the blade end of the handle, and In some embodiments, the method may further comprise inserting the blade fastener into the blade end of the handle. The blade fastener may be inserted into the blade end of the handle so that the blade fastener extends axially through the new rotary blade to secure the new rotary blade to the handle.

In some embodiments, the handle may comprise a handle body and a retractable blade guard coupled to the handle body to define a portion of the blade end of the handle. The retractable blade guard may be slidable relative to the handle body between a guard position in which the blade guard blocks access to a blade edge of the rotary blade and a retracted position in which the blade guard has moved away from the blade edge of the rotary blade so that the blade edge is exposed to cut the piece of fabric.

In some embodiments, the method may further include moving the retractable blade guard to the retracted position. Moving the retractable blade guard to the retracted position may cause the magnet to move away from the new rotary blade so that the new rotary blade is free to rotate about the axis.

In some embodiments, the blade retention system may further comprise a quick release mechanism. The quick release mechanism may be configured to change between a locked configuration in which movement of the blade fastener relative to the handle is blocked and an unlocked configuration in which movement of the blade fastener away from the handle is permitted.

In some embodiments, the method may further comprise changing the quick release mechanism from the locked configuration to the unlocked configuration. Changing the quick release mechanism from the locked configuration to the unlocked configuration may cause the blade fastener to move away from the handle to allow access to the old rotary blade.

These and other features of the present disclosure will become more apparent from the following description of the illustrative embodiments.

DETAILED DESCRIPTION OF THE DRAWINGS

Figure 1:
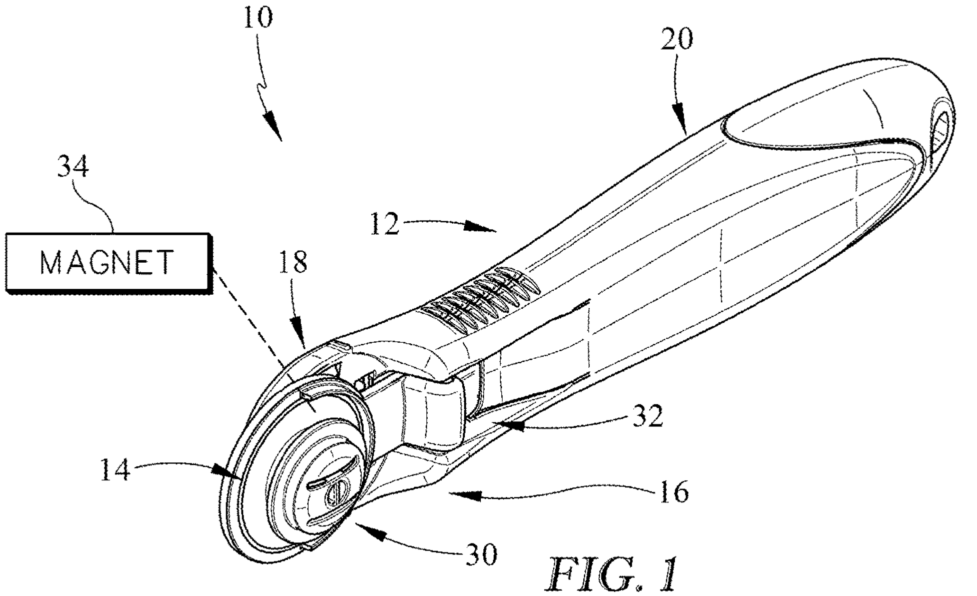
FIG. 1 is a perspective view of a hand-held, rotary fabric cutter including a handle, a rotary blade, and a blade retention system configured to attach the blade to handle so the blade rotates about an axis.

For the purposes of promoting an understanding of the principles of the disclosure, reference will now be made to a number of illustrative embodiments illustrated in the drawings and specific language will be used to describe the same.

A hand-held, rotary fabric cutter 10 adapted for cutting fabric is shown in FIGS. 1-16. The rotary fabric cutter 10 includes a handle 12, a rotary blade 14, and a blade retention system 16. The handle 12 has a blade end 18 and a grip end 20 opposite the blade end 18 that is configured to be held by a user 11 to support the cutter 10 during use of the cutter 10 to cut a piece of fabric. The rotary blade 14 is configured to be coupled to the blade end 18 of the handle 12 to rotate about an axis 22. The blade retention system 16 is configured to selectively couple the rotary blade 14 to the handle 12.

Figure 8:
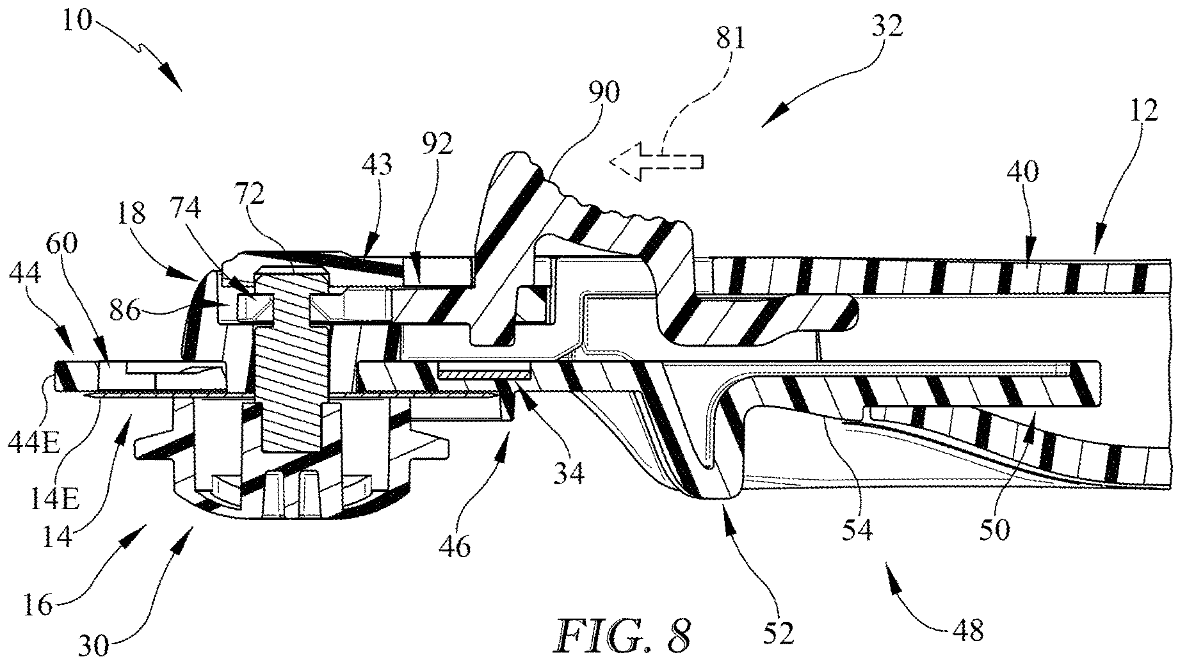
FIG. 8 is a cross-section view of the rotary cutter of FIG. 1 showing the quick release mechanism in the locked configuration and the blade fastener in a secured position in which the blade fastener extends through the rotary blade into the post retainer.
Figure 9:
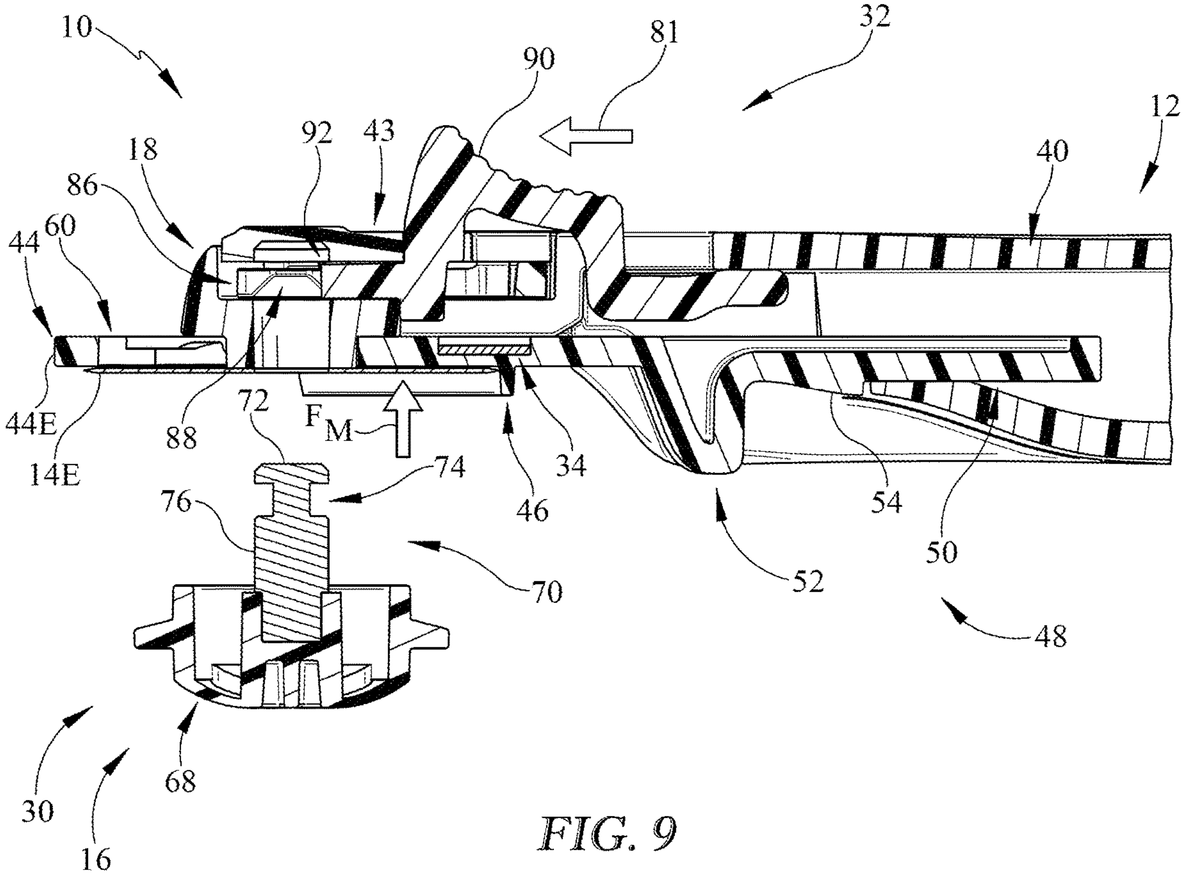
FIG. 9 is a view similar to FIG. 8 showing the quick release mechanism has moved to the unlocked configuration to cause the blade fastener to change to a released position in which the blade fastener is free to move away from the blade handle and showing the magnet applies magnetic force to the rotary blade to drawn the rotary blade to the handle so that the rotary blade remains coupled to the blade end of the handle when the blade fastener is in the released position.
Figure 10:
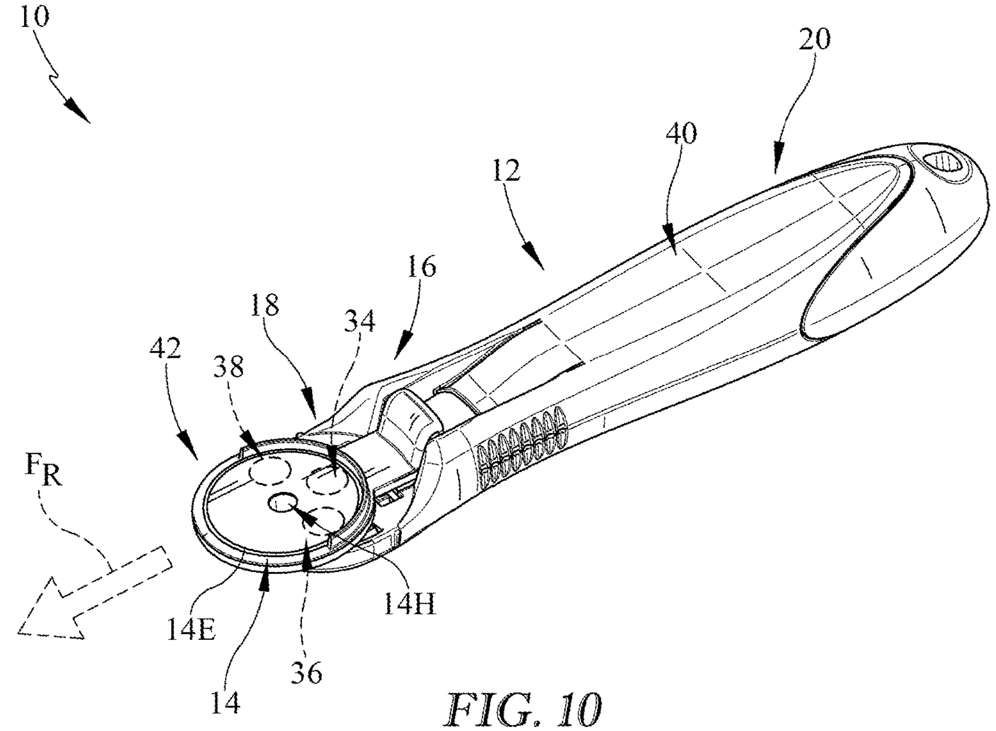
FIG. 10 is perspective view of the rotary fabric cutter of FIG. 9 showing the blade fastener has been moved to the released position so that the rotary blade may be removed from the handle by a user.
Figure 11:
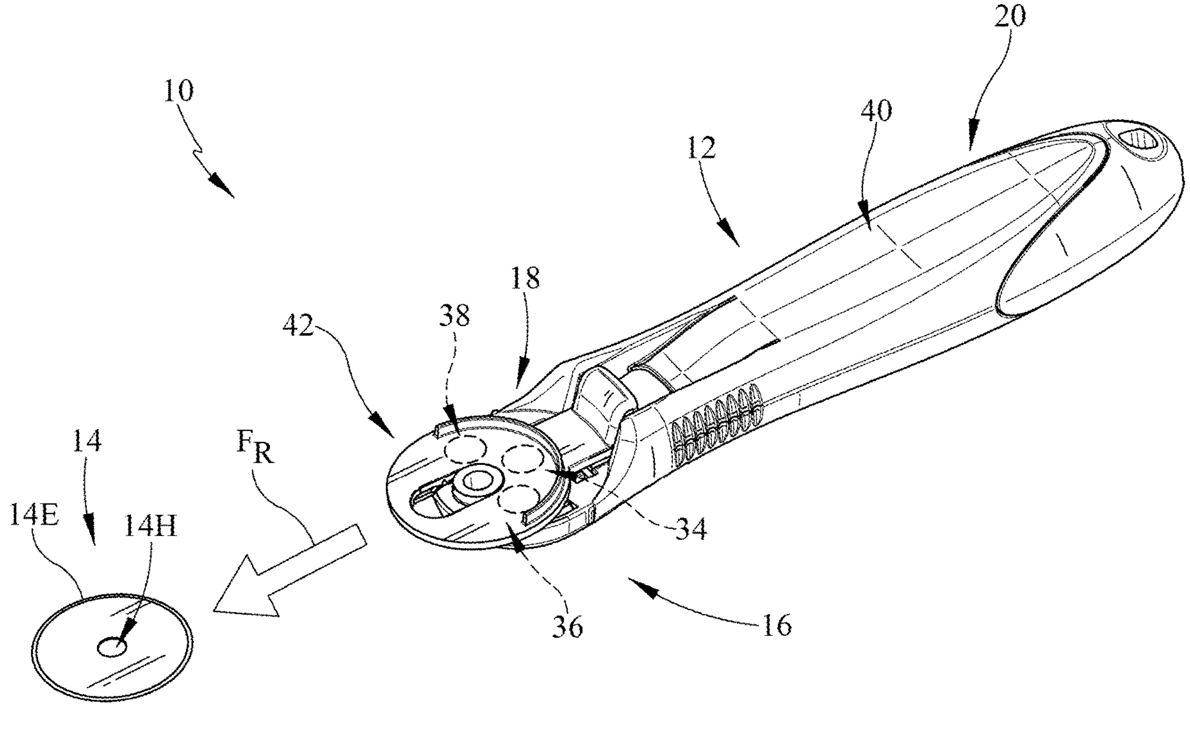
FIG. 11 is a view similar to FIG. 10 showing the used has applied a removal force to the rotary blade to remove from the handle so that a new rotary blade may be coupled to the handle.
Figure 12:
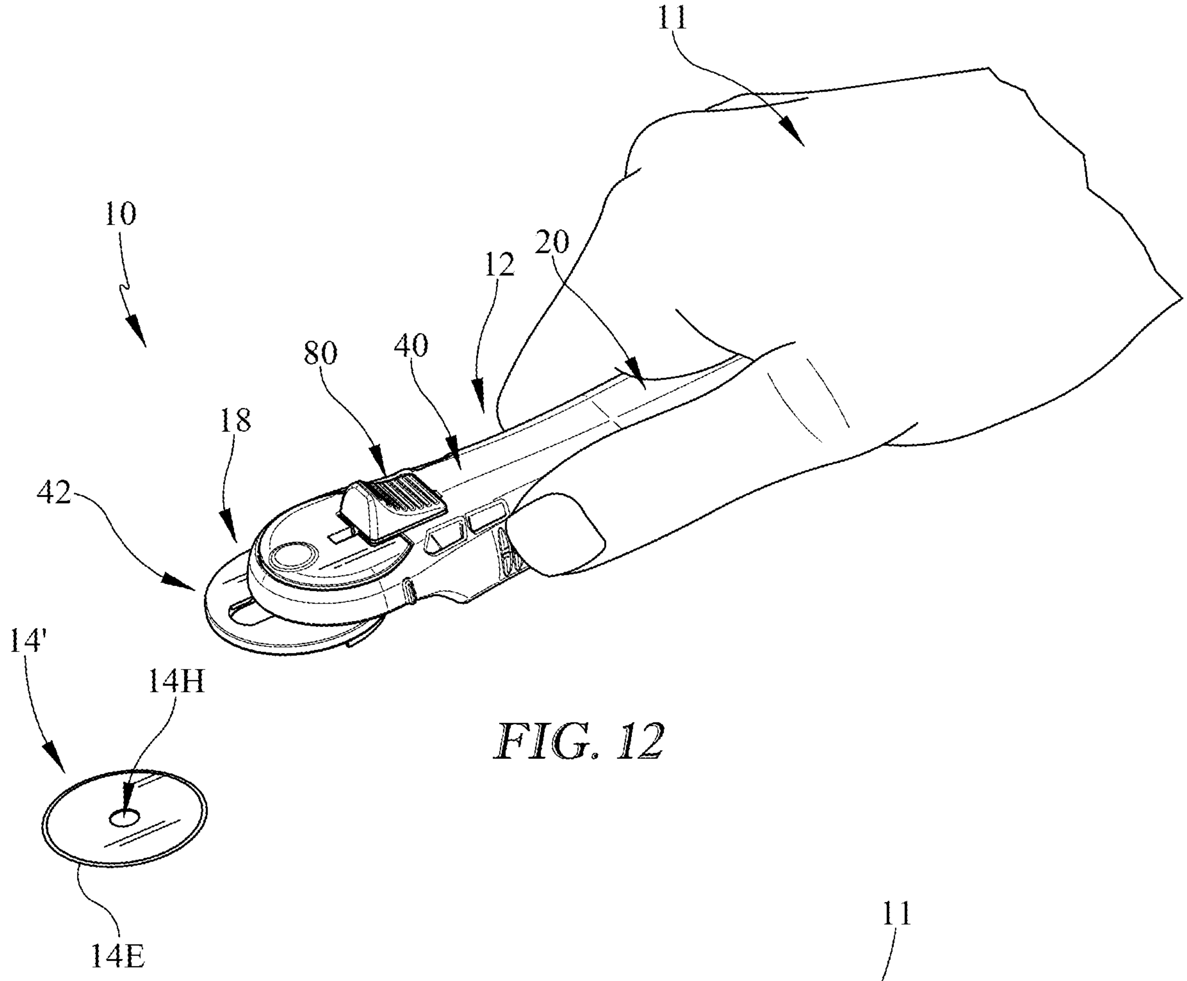
FIG. 12 is a perspective view of the rotary fabric cutter of FIG. 11 showing the user moving the handle over the new rotary blade so that the magnet applies the magnetic force to the new rotary blade.
Figure 13:
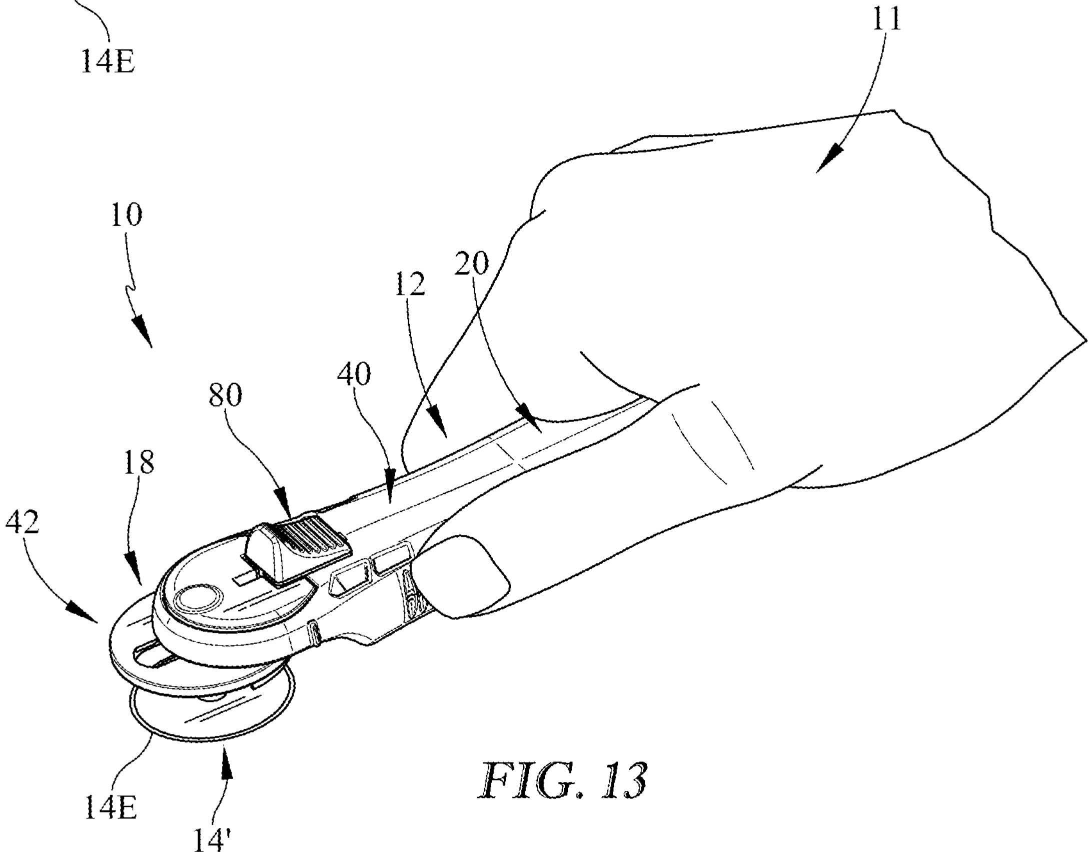
FIG. 13 is view similar to FIG. 12 showing the user has moved the handle over the new rotary blade so that the blade end of the handle aligns with the new rotary blade.

The blade retention system 16 includes a blade fastener 30, a quick release mechanism 32, and a magnet 34 coupled to the blade end 18 of the handle 12 as shown in FIGS. 1-16. The blade fastener 30 is configured to change between a secured position as shown in FIG. 8 and a released position as shown in FIG. 9 to selectively couple the rotary blade 14 to the blade end 18 of the handle 12. In the secured position, the blade fastener 30 extends axially through the rotary blade 14 into the blade end 18 of the handle 12 to secure the rotary blade 14 to the handle 12. In the released position, the blade fastener 30 is free to move relative to the handle 12 to allow access to the blade 14.

The quick release mechanism 32 is configured to change between a locked configuration as shown in FIG. 8 and an unlocked configuration as shown in FIG. 9 to control the position of the blade fastener 30. In the locked configuration, the release mechanism 32 blocks movement of the blade fastener 30 relative to the handle 12 when the blade fastener 30 is in the secured position. In the unlocked configuration, movement of the blade fastener 30 away from the handle 12 is permitted so that the blade fastener 30 may be moved from the secured position to the released position.

The blade edge 14E of the rotary blade 14 is sharp such that the blade 14 needs to be handled with care. This is especially true when changing out the rotary blade 14 for a newer, sharper blade 14'. Each blade 14, 14' needs to be carefully handled so that the user 11 does not accidently harm themselves.

Figure 14:
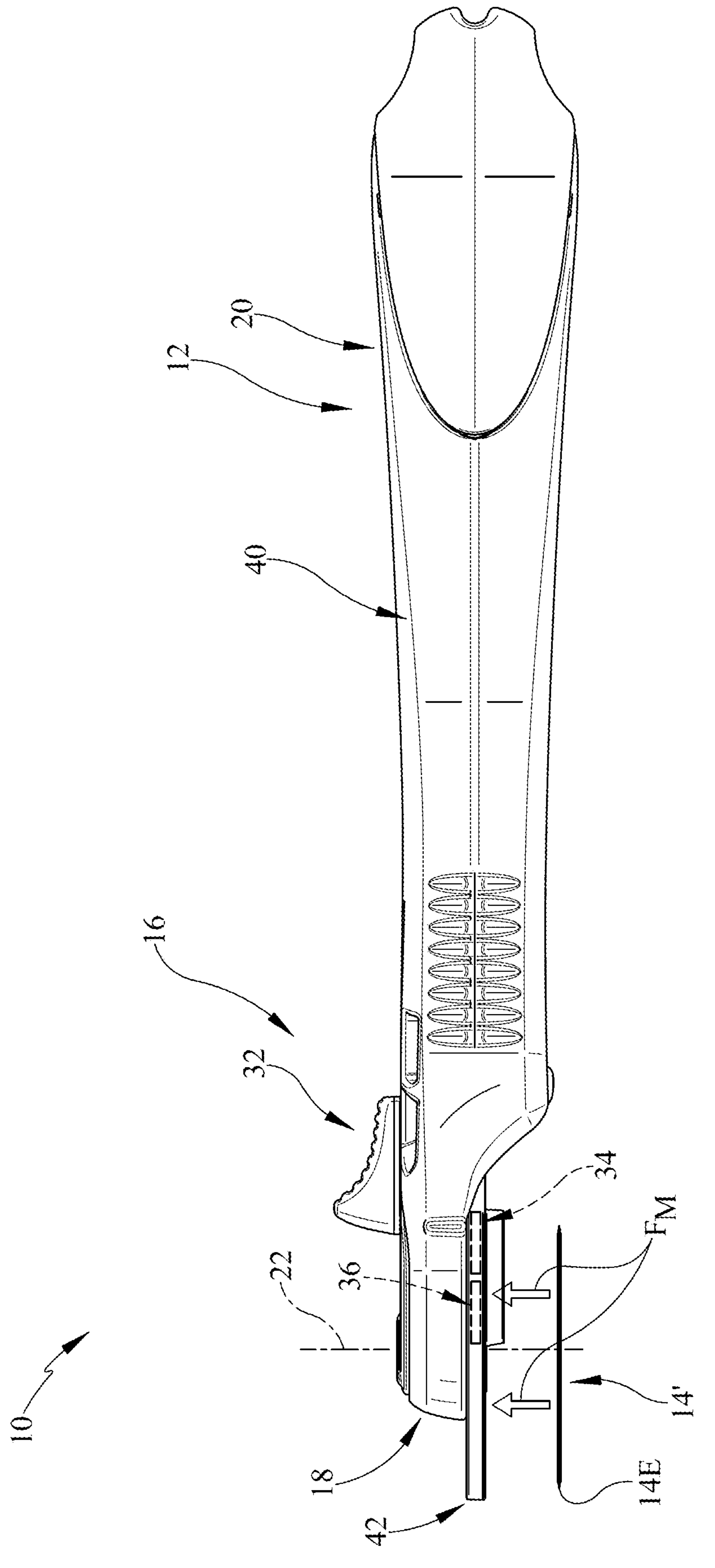
FIG. 14 is a side view of the rotary fabric cutter of FIG. 13 showing the alignment of the handle with the new rotary blade so that the magnet applies the magnetic force to the new rotary blade to draw the rotary blade to the blade end of the handle.
Figure 15:
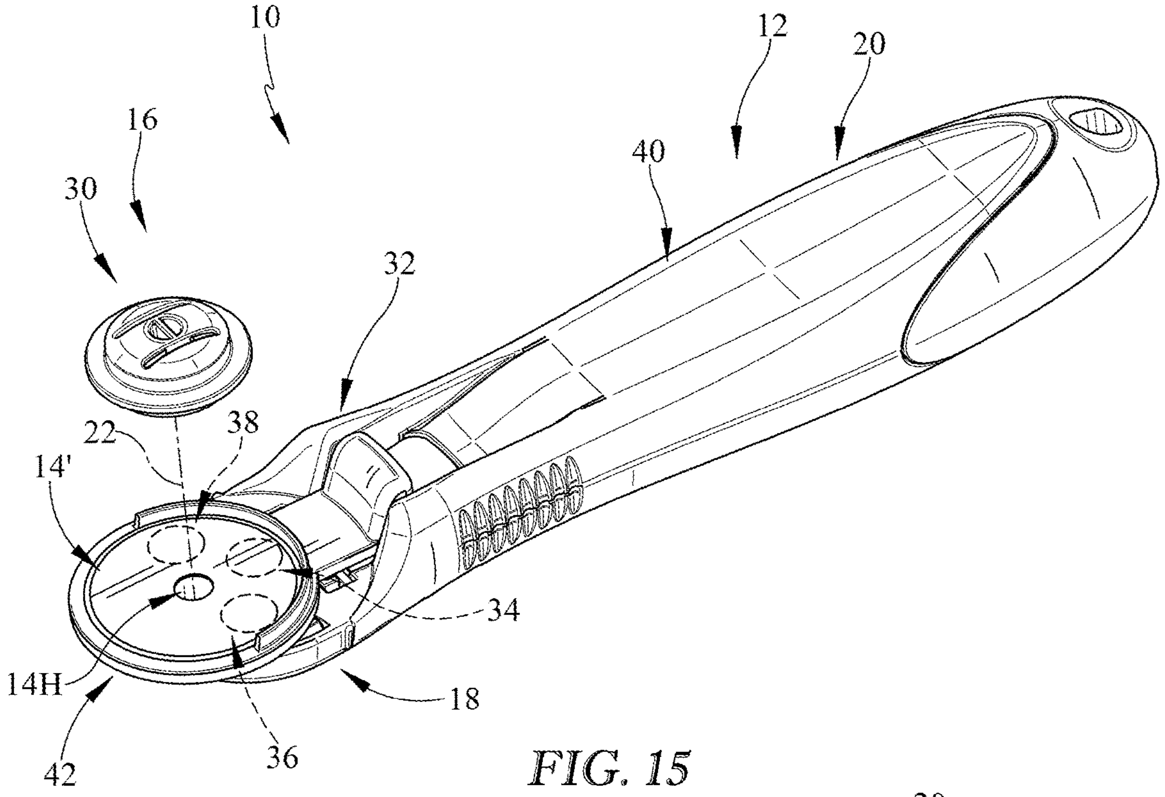
FIG. 15 is a perspective view of the rotary fabric cutter of FIG. 14 showing the new blade in position on the blade end of the handle and the blade fastener aligned with a hole in the rotary blade so that the blade fastener may be returned to the secured position.
Figure 16:
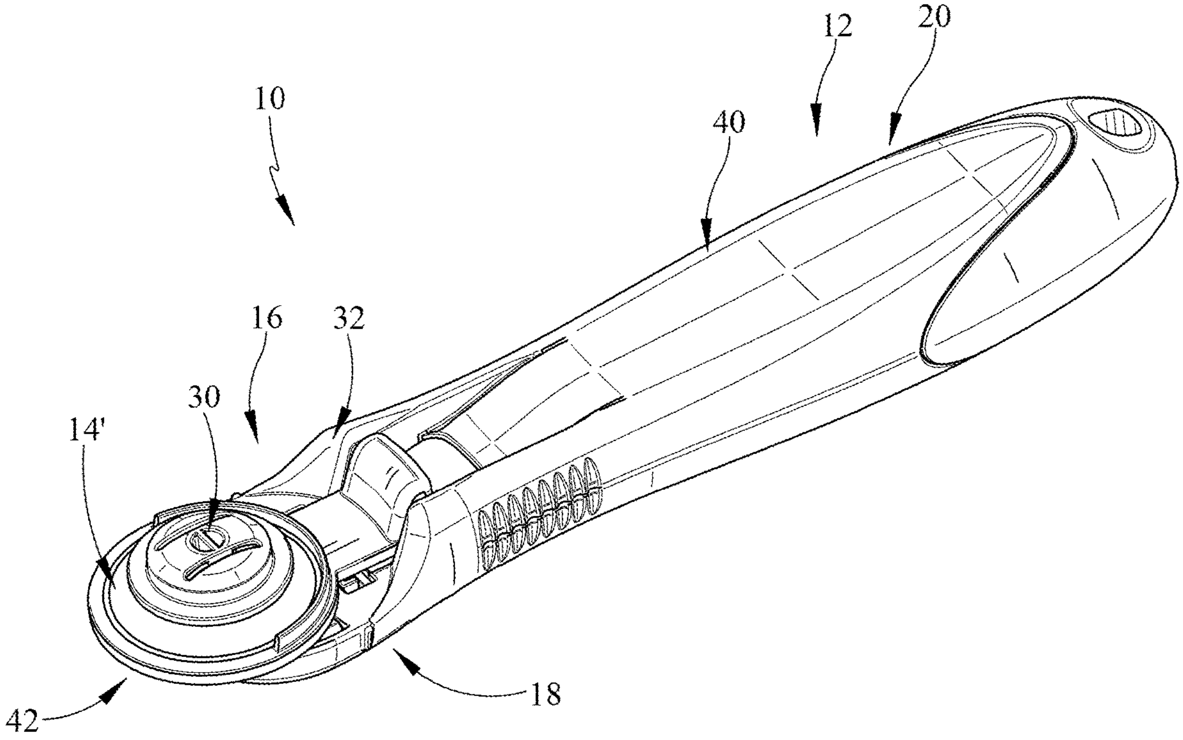
FIG. 16 is a view similar to FIG. 15 showing the blade fastener has been inserted through the rotary blade into the blade end of the handle so that the blade fastener is in the secured position.

The magnet 34 in the handle 12 is configured to apply a magnetic force $F_M$ to the rotary blade 14 to draw the rotary blade 14 to the blade end 18 of the handle 12 as shown in FIGS. 9 and 14. In this way, the rotary blade 14 remains coupled to the blade end 18 of the handle 12 when the blade fastener 30 is in the released position. This improves the safety of changing out an old rotary blade 14 for the newer, sharper rotary blade 14'.

When the old rotary blade 14 is ready to be replaced with the new rotary blade 14', the quick release mechanism 32 is changed to the unlocked position to cause the blade fastener 30 to move to the released position. As the blade fastener 30 moves to the released position, the magnet 34 prevents the old blade 14 from moving off the handle 12. This way, the user 11 does not have to worry about handling the blade 14 as the blade fastener 30 is released.

To remove the old blade 14 off the handle 12, the user 11 simply applies a removal force $F_R$ to the blade 14 to overcome the magnetic force $F_M$. In some embodiments, the user 11 may slide the blade 14 off the handle 12 by applying the removal force $F_R$ to an outer surface of the blade 14 away from the blade edge 14E. In other embodiments, the user 11 may avoid engaging the blade 14 by shaking the handle 12 over the disposal receptacle to apply the removal force $F_R$ to the blade 14. In this way, the user 11 does not have to touch the blade 14.

The magnet 34 also allows the user 11 to pick up the new rotary blade 14' without having to touch the new rotary blade 14'. To pick up the new blade 14', the user 11 moves the blade end 18 of the handle 12 over the new blade 14' so that a center hole 14H in the blade 14' aligns with the fastener hole 24 in the blade end 18 of the handle 12. The magnet 34 applies the magnetic force $F_M$ to the blade 14' to draw the blade 14' to the handle 12 as shown in FIG. 14.

In the illustrative embodiment, the blade retention system 16 includes a plurality of magnets 34, 36, 38 as shown in FIGS. 2, 4, 7, and 10-11. In some embodiments, the blade retention system 16 includes only one magnet 34. In other embodiments, the blade retention system 16 includes more than one magnet 34, 36, 38.

In the illustrative embodiment, the plurality of magnets 34, 36, 38 includes three magnets 34, 36, 38. The second and third magnets 36, 38 are spaced apart circumferentially from the first magnet 34. In the illustrative embodiment 34, the magnets 34, 36, 38 help align the blade 14' with the fastener hole 24 in the handle 12.

In some embodiments, the second and third magnets 36, 38 are of similar size and smaller than the first magnet 34. In the illustrative embodiment, all three magnets 34, 36, 38 are of the same size.

Turning again to the handle 12, the handle 12 includes a handle body 40 and a retractable blade guard 42 as shown in FIGS. 2-4 and 8-16. The handle body 40 is shaped to define the grip end 20 of the handle 12 and a portion of the blade end 18 of the handle 12. The retractable blade guard 42 is coupled to the handle body 40 to define another portion of the blade end 18 of the handle 12.

Figure 3:
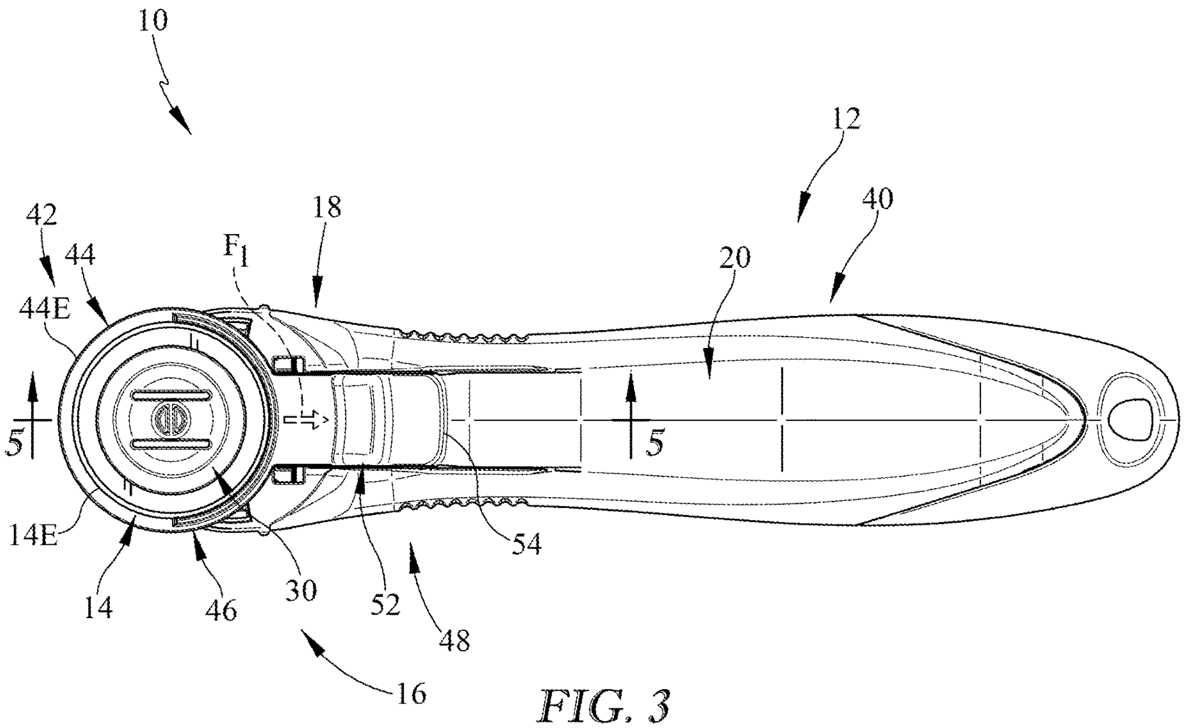
FIG. 3 is an elevation view of the rotary fabric cutter of FIG. 1 showing the blade guard in a guard position in which the blade guard blocks access to a blade edge of the rotary blade.
Figure 4:
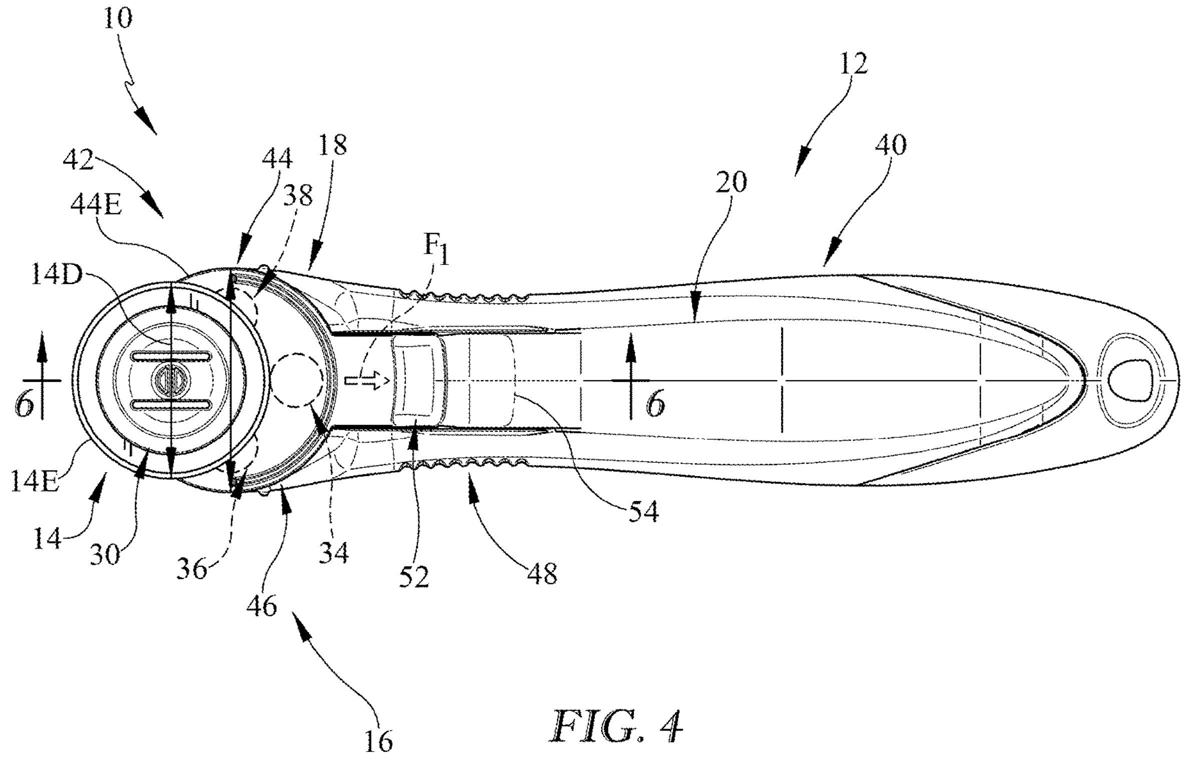
FIG. 4 is a view similar to FIG. 3 showing the blade guard has moved to a retracted position in which the blade guard is spaced apart from the blade edge of the rotary blade so that the blade edge is exposed to cut the piece of fabric.
Figure 5:
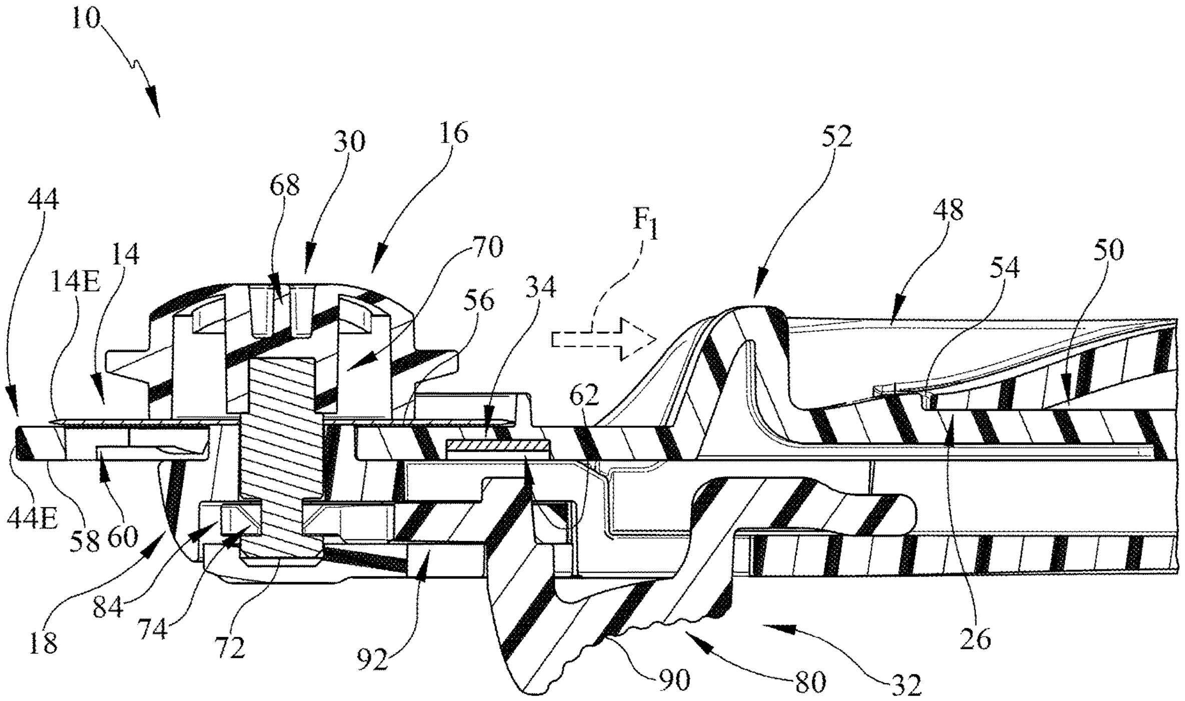
FIG. 5 is a cross-section view of FIG. 3 taken along line 5-5 showing the blade guard in the guard position with the magnet located between the handle body and the blade guard.
Figure 6:
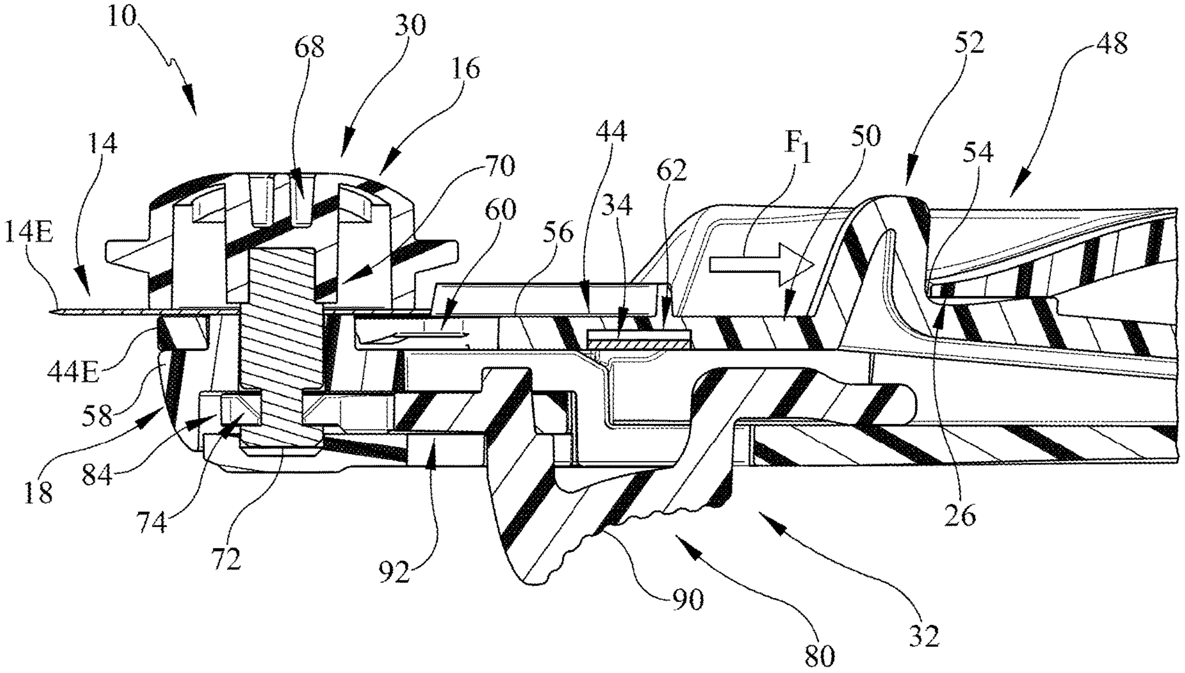
FIG. 6 is a cross-section view of FIG. 4 taken along line 6-6 showing the blade guard has moved to the retracted position such that the magnet has moved with the blade guard and is spaced apart from the rotary blade.

The retractable blade guard 42 is slidable relative to the handle body 40 between a guard position as shown in FIGS. 3 and 5 and a retracted position as shown in FIGS. 4 and 6. In the guard position, the blade guard 42 blocks access to a blade edge 14E of the rotary blade 14 to protect the user 11 from accidently cutting themselves or others with the blade 14 when the cutter 10 is not in use. In the retracted position, the blade guard 42 has moved away from the blade edge 14E of the rotary blade 14 so that the blade edge 14E is exposed to cut the piece of fabric.

In the illustrative embodiment, the magnets 34, 36, 38 are located between the handle body 40 and the retractable blade guard 42 as shown in FIGS. 5 and 6. The magnets 34, 36, 38 are located between the handle body 40 and the guard 42 so as to move with the guard 42 between the guard position and the retracted position.

When the guard 42 is in the guard position, the magnets 34, 36, 38 apply the magnet force $F_M$ to the rotary blade 14, which limits the rotation of the rotary blade 14 about the axis 22. To reduce the magnet force $F_M$ applied to the blade 14, the magnets 34, 36, 38 may be moved away from the blade 14. To do so, the guard 42 is moved to the retracted position.

As the guard 42 moves to the retracted position, the magnets 34, 36, 38 move away from the rotary blade 14 as shown in FIG. 6. This spaces the magnets 34, 36, 38 apart from the blade edge 14E so that the magnet force $F_M$ applied to the rotary blade 14 is reduced. The reduced magnet force $F_M$ allows the blade 14 to rotate about the axis 22 as the user 11 uses the rotary cutter 10 to cut the fabric.

When the guard 42 is moved back to the guard position, the magnets 34, 36, 38 are moved back toward the blade 14. The magnet force $F_M$ is once again applied to the blade 14, which limits the rotation of the rotary blade 14 about the axis 22. This adds another level of safety to the rotary cutter 10 as the magnets 34, 36, 38 provide some anti-rotation to the blade 14 when the rotary cutter 10 is not in use.

In the illustrative embodiment, the retractable blade guard 42 is shaped to include a circular guard portion 44, a guard lip 46, and a tab handle 48 as shown in FIGS. 2-9. The circular guard portion 44 is planar and concentric with the rotary blade 14 when the blade guard 42 is in the guard position. The circular guard portion 44 has a diameter 44D that is greater than a diameter 14D of the rotary blade 14 so that the blade edge 14E of the rotary blade 14 is spaced apart from an outer edge 44E of the circular guard portion 44. The guard lip 46 extends axially from the circular guard portion 44 and circumferentially around a portion of the rotary blade 14. The tab handle 48 extends radially from the circular guard portion 44 toward the grip end 20 of the handle 12 into a cavity 28 formed in the handle 12.

The tab handle 48 is configured to be engaged by the user 11 to slide the blade guard 42 between the guard position as shown in FIGS. 3 and 5 and the retracted position as shown in FIGS. 4 and 6. The user 11 applies a force $F_1$ to the tab handle 48 in a first direction to cause the blade guard 42 to move to the retracted position. The user 11 may then apply the force $F_1$ in a second direction opposite the first direction to cause the blade guard 42 to move back to the guard position. The tab handle 48 is biased toward the guard position in the illustrative embodiment.

In the illustrative embodiment, the tab handle 48 includes a planar portion 50, a tab portion 52, and a projection 54 as shown in FIGS. 3-6 The planar portion 50 extends radially from the circular guard portion 44 toward the grip end 20 of the handle 12 into the cavity 28 in the handle 12. The tab portion 52 extends axially away from the handle 12 and is configured to be engaged by the user 11 to move the blade guard 42. The projection 54 extends axially away from the handle 12 at a location spaced apart from the tab portion 52.

The projection 54 engages with a portion 26 of the handle body 40 in the guard position to block movement of the guard 42 to the retracted position as shown in FIG. 5. To change the retractable blade guard 42 to the retracted position, the user 11 engages the tab portion 52 to move the projection 54 inward so that the projection 54 may slide past the portion 26 of the handle body 40 as shown in FIG. 6. In this way, the blade guard 42 may be moved from the guard position to the retracted position.

The circular guard portion 44 is formed to include a fastener slot 60 and magnet recesses 62, 64, 66 as shown in FIGS. 2 and 5-9. The slot 60 extends axially through a top surface 56 of the circular guard portion 44 and a bottom surface 58 of the circular guard portion 44. The slot 60 as receives a portion of the blade fastener 30. The slot 60 also extends in the radial direction which allows the blade guard 42 to slide relative to the handle 12 when the blade guard 42 is moved between the guard position and the retracted position as shown in FIGS. 5 and 6. The magnet recesses 62, 64, 66 extend axially into the bottom surface 58 of the circular guard portion 44, while the rotary blade 14 confronts the top surface 56 of the circular guard portion 44.

Each of the magnets 34, 36, 38 are located in one of the magnet recesses 62, 64, 66 formed in the circular guard portion 44. This locates the magnets 34, 36, 38 between the handle body 40 and the retractable blade guard 42 so that the magnets 34, 36, 38 move with the blade guard 42 between the guard position and the retracted position.

The blade fastener 30 includes a fastener head 68 and a post 70 as shown in FIGS. 2 and 5-9. The fastener head 68 acts as a handle for the blade fastener 30. The post 70 extends axially from the fastener head 68 to a terminal end 72. In the secured position, the post 70 extends through the rotary blade 14 into the blade end 18 of the handle 12 so that the terminal end 72 of the post 70 is engaged by the quick release mechanism 32.

The post 70 of the blade fastener 30 is shaped to include an annular notch 74 as shown in FIGS. 2 and 5-9. The annular notch 74 extends partway into an outer surface 76 of the post 70 at a location spaced apart from the terminal end 72 of the post 70. The quick release mechanism 32 engages the post 70 in the notch 74 to block movement of the blade fastener 30 in the locked configuration.

Figure 2:
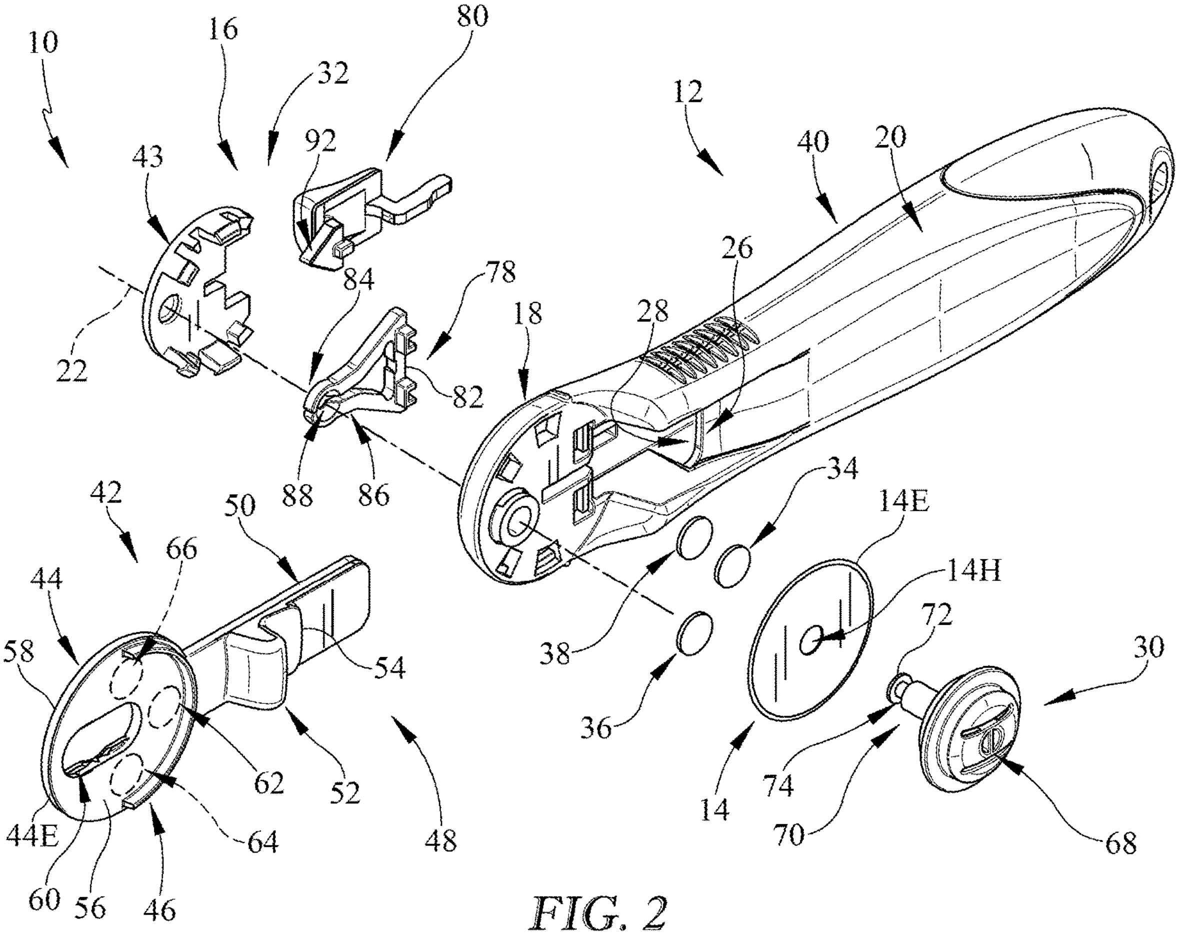
FIG. 2 is an exploded view of the rotary fabric cutter of FIG. 1 showing the handle includes a handle body and a blade guard configured to be coupled to the handle body to block access to the rotary blade and showing the blade retention system includes a blade fastener configured to selectively couple the rotary blade to a blade end of the handle, a quick release mechanism configured to selectively release the blade fastener to permit access to the rotary blade, and magnets configured to apply a magnetic force to the rotary blade to draw the rotary blade to the blade end of the handle.
Figure 7:
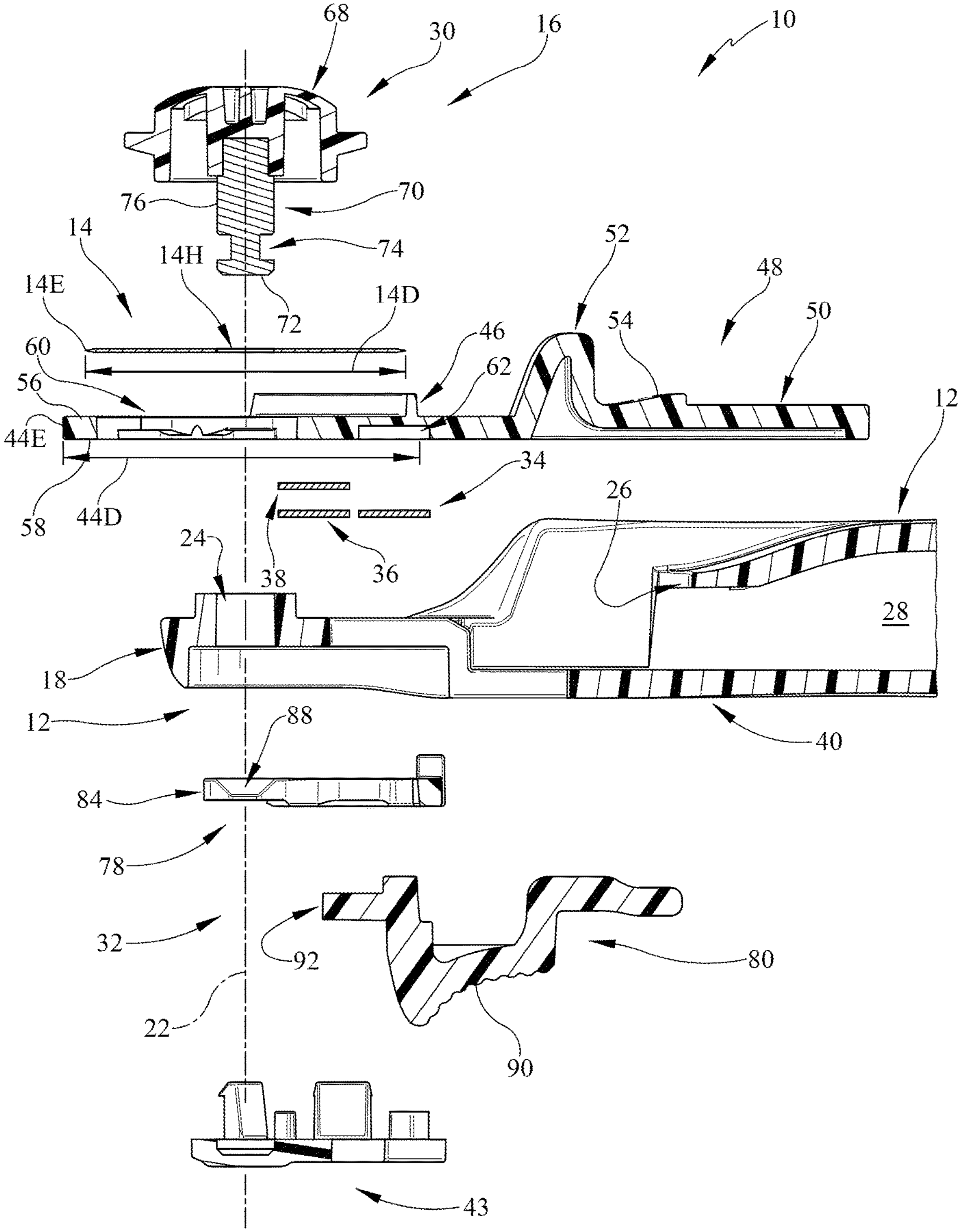
FIG. 7 is an exploded view of the rotary fabric cutter of FIG. 1 showing the quick release mechanism includes a post retainer configured to receive a portion of the blade fastener and configured to change between a closed position when the quick release mechanism is in a locked configuration as shown in FIG. 8 and an open position when the quick release mechanism is in an unlocked configuration as shown in FIG. 9 and a release lever coupled to the handle and slidable relative to the handle body to change the post retainer from the closed position to the open position.

The quick release mechanism 32 includes a post retainer 78 and a release lever 80 as shown in FIGS. 2 and 7. The post retainer 78 is coupled to the handle 12 between the handle body 40 and a bottom closure 43 of the handle 12. The post retainer 78 is configured to engage the post 70 of the blade fastener 30 in the annular notch 74 when the blade fastener 30 is in the secured position. The release lever 80 is coupled to the handle 12. The release lever 80 is slidable relative to the handle body 40 to change the post retainer 78 between a closed position as shown in FIG. 8 and an open position as shown in FIG. 9.

The release lever 80 is slidable relative to the handle body 40 between a first position when the quick release mechanism 32 is in the locked configuration as shown in FIG. 8 and a second position when the quick release mechanism 32 is in the unlocked configuration as shown in FIG. 9. When the release lever 80 in the first position, the post retainer 78 is in the closed position so that the post retainer 78 engages the post 70 of the blade fastener 30 to block movement of the blade fastener 30.

To change the quick release mechanism 32 from the locked configuration to the unlocked configuration, the release lever 80 is moved in the second direction as indicated by arrow 81 from the first position to the second position to cause the post retainer 78 to change to the open position. In the open position, the post retainer 78 has moved out of the annular notch 74 formed in the post 70 of the blade fastener 30 so that the blade fastener 30 is free to move relative to the blade handle 12.

The post retainer 78 includes a base 82, a first retainer arm 84, and a second retainer arm 86 as shown in FIGS. 2 and 5-9. The first and second retainer arms 84, 86 extend radially from the base 82 and confront each other at a location spaced apart from the base 82. The first and second retainer arms 84, 86 are flexible and configured to move relative to each other.

The first and second retainer arms 84, 86 form a post hole 88 therebetween where the first retainer arm 84 confronts the second retainer arm 86 as shown in FIGS. 2 and 7. The post 70 of the blade fastener 30 extends through the post hold 88 of the post retainer 78.

In the illustrative embodiment, the post hole 88 has a diameter equal to the diameter of the post 70 at the annular notch 74. The first retainer arm 84 and the second retainer arm 86 engage the post 70 in the notch 74 when the blade fastener 30 is in the secured position to block movement of the blade fastener 30 relative to the handle 12.

The release lever 80 includes a thumb tab 90 and a lever tab 92 that extends from the thumb tab 90 as shown in FIGS.

2 and 5-9. The thumb tab 90 is configured to be engaged by the user 11. The lever tab 92 is positioned in between the first and second retainer arms 84, 86.

To release the blade fastener 30, the user 11 engages the thumb tab 90 of the release lever 80 to move the release lever 80 in the second direction from the first position to the second position. This causes the lever tab 92 of the release lever 80 to engage the first and second retainer arms 84, 86 and move the post retainer 78 from the closed position to the open position.

The lever tab 92 of the release lever 80 pushes the first and second retainer arms 84, 86 away from each other to expand the diameter of the post hole 88. The larger diameter of the post hole 88 allows the post 70 of the blade fastener 30 to move out and away from the post retainer 78. The first and second retainer arms 84, 86 are biased back to the closed position once the use stops engaging the release lever 80.

Once the new blade 14' is in position on the handle 12, the user 11 inserts the post 70 of the blade fastener 30 through the center hole 14H of the blade 14' through the fastener hole 24 in the blade end 18 of the handle 12 into the post hole 88 of the post retainer 78. By inserting the post 70, the post 70 moves the first and second retainer arms 76, 78. Once the first and second retainer arms 76, 78 reach the notch 72, the first and second retainer arms 76, 78 move into the notch 72 to block movement of the blade fastener 30.

A method of assembling and disassembling the blade 14, 14' on the rotary cutter 20 may include several steps. To begin replacing the old blade 14 with the newer blade 14', the quick release mechanism 32 is changed from the locked configuration to the unlocked configuration to cause the blade fastener 30 to move away from the handle 12 to allow access to the old rotary blade 14.

The user 11 then applies the removal force $F_R$ to the old rotary blade 14 to overcome the magnetic force $F_M$ of the magnet 36 so as to separate the old rotary blade 14 from the handle 12. In some embodiments, the user 11 may slide the blade 14 off the handle 12 by applying the removal force $F_R$ to the outer surface of the blade 14 away from the blade edge 14E. In other embodiments, the user 11 may avoid engaging the blade 14 and may shake the handle 12 over the disposal receptacle to apply the removal force $F_R$ to the blade 14. In this way, the user 11 does not have to touch the blade 14.

The magnet 36 is then moved over the new rotary blade 14' by moving the blade end 18 of the handle 12 over the new rotary blade 14'. This way, the magnetic force $F_M$ draws the new rotary blade 14' to the blade end 18 of the handle 12 so that the new rotary blade 14' is coupled to the blade end 18 of the handle 12.

The blade fastener 30 is then inserted into the fastener hole 24 formed in the blade end 18 of the handle 12 so that the blade fastener 30 extends axially through the new rotary blade 14' to secure the new rotary blade 14' to the handle 12.

Once the blade 14' is secured on the handle 12, the retractable blade guard 42 is moved to the retracted position to cause the magnet 36 to move away from the new rotary blade 14'. In this way, the magnet 36 is spaced apart from the new rotary blade 14' and the blade 14 is free to rotate about the axis 22.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A hand-held, rotary fabric cutter comprising:

a handle having a blade end and a grip end opposite the blade end configured to be held by a user to support the cutter during use of the cutter to cut a piece of fabric, a rotary blade configured to be coupled to the blade end of the handle to rotate about an axis, and a blade retention system configured to selectively couple the rotary blade to the handle, the blade retention system comprising a blade fastener configured to change between a secured position in which the blade fastener extends axially through the rotary blade into the blade end of the handle to secure the rotary blade to the handle and a released position in which the blade fastener has moved away from the handle to allow access to the blade, a quick release mechanism configured to change between a locked configuration in which movement of the blade fastener relative to the handle is blocked when the blade fastener is in the secured position and an unlocked configuration in which movement of the blade fastener away from the handle is permitted, and at least one magnet coupled to the blade end of the handle, wherein the at least one magnet is located between the rotary blade and the blade end of the handle, the at least one magnet configured to apply a magnetic force to the rotary blade to draw the rotary blade to the blade end of the handle so that the rotary blade remains coupled to the blade end of the handle when the blade fastener is in the released position.

2. The rotary fabric cutter of claim 1, wherein the handle comprises:

a handle body, and a retractable blade guard coupled to the handle body to define a portion of the blade end of the handle and slidable relative to the handle body between a guard position in which the blade guard blocks access to a blade edge of the rotary blade and a retracted position in which the blade guard has moved away from the blade edge of the rotary blade so that the blade edge is exposed to cut the piece of fabric.

3. The rotary fabric cutter of claim 2, wherein the at least one magnet is located between the handle body and the retractable blade guard and configured to move with the blade guard between the guard position and the retracted position.

4. The rotary fabric cutter of claim 3, wherein the blade fastener includes a fastener head and a post that extends axially from the fastener head into the blade end of the handle when the blade fastener is in the secured position.

5. The rotary fabric cutter of claim 2, wherein the blade retention system includes at least two magnets.

6. The rotary fabric cutter of claim 5, wherein the blade retention system includes three magnets.

7. The rotary fabric cutter of claim 6, wherein each magnet is located between the handle body and the retractable blade guard and configured to move with the blade guard between the guard position and the retracted position.

8. The rotary fabric cutter of claim 1, wherein the quick release mechanism comprises:

a post retainer coupled to the handle and configured to receive a portion of the blade fastener when the blade fastener is in the secured position, the post retainer configured to change between a closed position when the quick release mechanism is in the locked configuration and an open position when the quick release mechanism is in the unlocked configuration, and a release lever coupled to the handle and slidable relative to the handle body between a first position when the quick release mechanism is in the locked configuration and a second position when the quick release mechanism is in the unlocked configuration in which the release lever engages the post retainer to cause the post retainer to change from the closed position to the open position.

9. The rotary fabric cutter of claim 8, wherein the handle comprises:

a handle body, and a retractable blade guard coupled to the handle body to define a portion of the blade end of the handle and slidable relative to the handle body between a guard position in which the blade guard blocks access to a blade edge of the rotary blade and a retracted position in which the blade guard has moved away from the blade edge of the rotary blade so that the blade edge is exposed to cut the piece of fabric.

10. The rotary fabric cutter of claim 9, wherein the at least one magnet is located between the handle body and the retractable blade guard and configured to move with the blade guard between the guard position and the retracted position.

11. A hand-held, rotary fabric cutter comprising:

a handle having a blade end and a grip end opposite the blade end configured to be held by a user to support the cutter during use of the cutter to cut a piece of fabric, a rotary blade configured to be coupled to the blade end of the handle to rotate about an axis, and a blade retention system configured to selectively couple the rotary blade to the handle, the blade retention system comprising a blade fastener configured to change between a secured position in which the blade fastener extends axially through the rotary blade into the blade end of the handle to secure the rotary blade to the handle and a released position in which the blade fastener has moved away from the handle to allow access to the blade, and at least one magnet coupled to the blade end of the handle and configured to apply a magnetic force to the rotary blade to draw the rotary blade to the blade end of the handle so that the rotary blade remains coupled to the blade end of the handle when the blade fastener is in the released position, wherein the handle comprises: a handle body, and a retractable blade guard coupled to the handle body to define a portion of the blade end of the handle and slidable relative to the handle body between a guard position in which the blade guard blocks access to a blade edge of the rotary blade and a retracted position in which the blade guard has moved away from the blade edge of the rotary blade so that the blade edge is exposed to cut the piece of fabric, wherein the at least one magnet is located between the handle body and the retractable blade guard and configured to move with the blade guard between the guard position and the retracted position.

12. The rotary fabric cutter of claim 11, wherein the blade fastener includes a fastener head and a post that extends axially from the fastener head into the blade end of the handle when the blade fastener is in the secured position.

13. The rotary fabric cutter of claim 11, further comprising a quick release mechanism configured to change between a locked configuration in which movement of the blade fastener relative to the handle is blocked when the blade fastener is in the secured position and an unlocked configuration in which movement of the blade fastener away from the handle is permitted.

14. The rotary fabric cutter of claim 13, wherein the quick release mechanism comprises:

a post retainer coupled to the handle and configured to receive a portion of the blade fastener when the blade fastener is in the secured position, the post retainer configured to change between a closed position when the quick release mechanism is in the locked configuration and an open position when the quick release mechanism is in the unlocked configuration, and a release lever coupled to the handle and slidable relative to the handle body between a first position when the quick release mechanism is in the locked configuration and a second position when the quick release mechanism is in the unlocked configuration in which the release lever engages the post retainer to cause the post retainer to change from the closed position to the open position.

15. The rotary fabric cutter of claim 11, wherein the blade retention system includes at least two magnets.

16. The rotary fabric cutter of claim 15, wherein the blade retention system includes three magnets.

* * * * *